United States Patent
Jiang et al.

(10) Patent No.: US 10,237,576 B2
(45) Date of Patent: Mar. 19, 2019

(54) 3D-HEVC DEPTH VIDEO INFORMATION HIDING METHOD BASED ON SINGLE-DEPTH INTRA MODE

(71) Applicant: Ningbo University, Ningbo, Zhejiang (CN)

(72) Inventors: Gangyi Jiang, Zhejiang (CN); Jing Wang, Zhejiang (CN); Yang Song, Zhejiang (CN); Hua Shao, Zhejiang (CN)

(73) Assignee: Ningbo University, Ningbo, Zhejiang (CN)

( * ) Notice: Subject to any disclaimer, the term of this patent is extended or adjusted under 35 U.S.C. 154(b) by 404 days.

(21) Appl. No.: 15/260,302

(22) Filed: Sep. 8, 2016

(65) Prior Publication Data

US 2016/0381389 A1 Dec. 29, 2016

(30) Foreign Application Priority Data

Jul. 5, 2016 (CN) .......................... 2016 1 0534911

(51) Int. Cl.
| | |
|---|---|
| *H04N 7/24* | (2011.01) |
| *H04N 19/593* | (2014.01) |
| *H04N 19/467* | (2014.01) |
| *H04N 19/463* | (2014.01) |
| *H04N 19/597* | (2014.01) |
| *H04N 19/48* | (2014.01) |
| *H04N 7/167* | (2011.01) |
| *H04N 19/176* | (2014.01) |

(52) U.S. Cl.
CPC ......... *H04N 19/593* (2014.11); *H04N 19/463* (2014.11); *H04N 19/467* (2014.11); *H04N 19/48* (2014.11); *H04N 19/597* (2014.11)

(58) Field of Classification Search
CPC ......... H04N 7/24; H04N 7/167; H04N 19/176
USPC .......................... 375/240.12, 240.16, E7.018
See application file for complete search history.

(56) References Cited

PUBLICATIONS

Wang, "An Information Hiding Algorithm for HEVC Based on Angle Differences of Intra Prediction Mode", Mar. 25, 2014 (Year: 2014).*
Lin, "An improved DCT-based perturbation scheme for high capacity data hiding in H.264/AVC intra frames", Oct. 16, 2011 (Year: 2011).*

* cited by examiner

*Primary Examiner* — Albert Kir (57) ABSTRACT

The present invention disclosed a 3D-HEVC depth video information hiding method based on single-depth intra mode, which comprises information embedment part and information extraction part. During information embedment, if the pixels in the candidate list are equal using the encrypt information to modulate the index of the pixel and completes the embedment. If the pixels are different, judging the neighboring CU of the CU whose depth is 2 or 3 and modulating the index of the pixel to complete embedment of the hidden information. The advantage of the present invention is high security, low calculation complexity and small influence on data rate.

5 Claims, 3 Drawing Sheets

3D-HEVC DEPTH VIDEO INFORMATION HIDING METHOD BASED ON SINGLE-DEPTH INTRA MODE

CROSS REFERENCE OF RELATED APPLICATION

The application claims priority under 35 U.S.C. 119(a-d) to CN 201610534911.1, filed Jul. 5, 2016.

BACKGROUND OF THE PRESENT INVENTION

Field of Invention

The present invention relates to a video information hiding technology, particularly involves a 3D-HEVC depth video information hiding method based on single-depth intra mode.

Description of Related Arts

With the development of the network and communication technology, information security is more and more important and pressing. Information hiding technology is an effective way to deal with this problem. 3D video became more and more popular in movie industry and for entertainment application so the 3D extension of HEVC (High Efficiency Video Coding) standard namely 3D-HEVC standard attracts much attention. Depth video is an important part of 3D video which is used for drawing color virtual viewpoint and not for direct view. Partial depth distortion of depth video will not cause the distortion of color virtual viewpoint, which makes the depth video information hiding technology under 3D-HEVC standard has significant meaning.

Conventionally, the video information hiding algorithm mainly based on single-viewpoint video coding standard. The information hiding technology based on single-viewpoint HEVC standard achieved preliminary development with the wide application of HEVC standard. For example, the HEVC intra prediction mode related information hiding algorithm brought up by WANG et al. which needs re-encoding using the modified prediction mode and thus has high complexity; Tew et al. proposed an algorithm in which the unit splitting depends on the embedded information and the parity modulation of quantized non-zero DCT coefficient is taken into consideration, as a result, the whole performance of the algorism gets improved. However, the 3D video information hiding algorithms are few. A blind watermarking algorithm of 3D video based on quantization index modulation brought up by Yang embeds the watermarking information in the DCT coefficients of the depth video. Since the algorithm embeds watermarking information in the image domain of the depth video, the embedded information may be lost after compressing. The conventional 3D video information hiding algorithm for compression domain is based on and extends from single-viewpoint H.264 standard, such as a reversible multi-view video information hiding algorithm brought up by SONG which hides the information in motion vectors of coding block in b4 frame using inner product. The method achieves good imperceptibility and is reversible. The 3D-HEVC has a significant better compression performance than H.264, which is capable of encoding a higher definition video sequence. So it is necessary to carry out research on 3D video information hiding algorithm based on 3D-HEVC coding standard. Since there are many smooth regions and edge regions in depth video, the performance of the information hiding algorithm is not able to achieve predicted effects if simply applies the information hiding technology of the color video on the depth video. In 3D-HEVC, there is a "single-depth intra mode" which is designed for the smooth region of the depth video while 3D video coding standard extended from single-viewpoint H.264 is not equipped, this provides a new way to embed the hidden information in depth video.

SUMMARY OF THE PRESENT INVENTION

An object of the present invention is to provide a 3D-HEVC depth video information hiding method based on single-depth intra mode, which has high security level, low complexity and small effect on bitrate.

In order to solve the conventional technical problem the present invention provides a 3D-HEVC depth video information hiding method based on single-depth intra mode, comprising information embedment and information extraction;

Therefore steps for the information embedment are as follow:

(1)_1, representing an original 3D (three dimensional) video by $S_{org}$, denoting a left view color video of $S_{org}$ as $L_{org}^{c}$, denoting a left view depth video corresponding to $L_{org}^{c}$ as $L_{org}^{d}$, denoting a right view color video of $S_{org}$ as $R_{org}^{c}$, denoting a right view depth video corresponding to $R_{org}^{c}$ as $R_{org}^{d}$; wherein $L_{org}^{c}$, $L_{org}^{d}$ and $R_{org}^{c}$, $R_{org}^{d}$ are compressed and encoded through a 3D-HEVC standard coding platform to generate a target video stream str.bin$_{org}$; M and N denote widths and heights of frames in $L_{org}^{c}$, $L_{org}^{d}$, $R_{org}^{c}$ and $R_{org}^{d}$ respectively; F denotes the number of frames contained in the $L_{org}^{c}$, $L_{org}^{d}$, $R_{org}^{c}$ or $R_{org}^{d}$; W represents hidden information to be embedded, wherein W comprises an n-bit value, $W=\{w_1, w_2, \ldots, w_i, \ldots, w_{n-1}, w_n\}$, $w_1$, $w_2$, $w_i$, $w_{n-1}$ and $w_n$ represent a first bit value, a second bit value, an i-th bit value, an n−1-th bit value and an n-th bit value in W respectively; values of $w_1, w_2, \ldots, w_i, w_{n-1}$ and $w_n$ are 0 or 1, $1 \leq i \leq n$, $$n \in \left[1, \frac{M \times N \times F}{8 \times 8}\right];$$

(1)_2, using logistics chaos mapping generates a pseudo-random binary sequence that contains n bits value as a key E, $E=\{e_1, e_2, \ldots, e_i, \ldots, e_{n-1}, e_n\}$; processing every bit value of E and the corresponding bit value of W with XOR to generate encrypted information W', $W'=\{w'_1, w'_2, \ldots, w'_i, \ldots, w'_{n-1}, w'_n\}$; wherein the initial information of the key E is given arbitrarily; $e_1, e_2, e_i, e_{n-1}$ and $e_n$ represent a first bit value, a second bit value, an i-th bit value, an n−1-th bit value and an n-th bit value in E respectively; the values of $e_1, e_2, e_i, e_{n-1}$ and $e_n$ are 0 or 1; $w'_1, w'_2, w'_i, w'_{n-1}$, and $w'_n$ represent a first bit value, a second bit value, an i-th bit value, an n−1-th bit value and an n-th bit value in W' respectively; the values of $w'_1, w'_2, w'_i, w'_{n-1}$ and $w'_n$ are 0 or 1, $1 \leq i \leq n$;

(1)_3, parsing each frame of the target video stream str.bin$_{org}$ and setting a current frame needing to be parsed in the target video stream str.bin$_{org}$ as a current frame;

(1)_4, determining whether the current frame is a left view depth frame or a right view depth frame, if yes executing step (1)_5 or else step (1)_8;

(1)_5, parsing each CTU (coding tree unit) of the current frame and setting a current CTU needing to be parsed in the current frame as a current parse block, then executing step (1)_6;

(1)_6 according to an optimal splitting mode of the current parse block, paring every coding mode corresponding to CU (coding unit) in the current parse block after being split; representing a k th CU in the current parse block by $B_{org}^{k}$; wherein a corresponding coding mode of $B_{org}^{k}$, is marked as $M_{org}^{k}$, k is a positive integer, $k \in [1,64]$; a size of the $B_{org}^{k}$ is 8×8, 16×16, 32×32 or 64×64, $M_{org}^{k} \in \{$intra coding mode, single-depth intra coding mode$\}$; executing the following steps of:

(1)_6a, setting a CU under processing in the current parse block as a current CU;

(1)_6b, assuming the current CU is $B_{org}^{k}$, wherein if the coding model $M_{org}^{k}$ corresponding to the current CU is an intra coding mode then executing step (1)_6i; if the coding model $M_{org}^{k}$ corresponding to the current CU is a single-depth intra coding mode then executing step (1)_6c;

(1)_6c, according to a coding theory of a single-depth intra coding mode, constructing a pixel candidate list of the coding mode $M_{org}^{k}$ corresponding to the current CU, which is marked as $list_{org}^{k}$; wherein $list_{org}^{k}$ contains 2 pixels; a first pixel is marked as $y_{org}^{k,1}$, an index of which is 0; and a second pixel is marked as $y_{org}^{k,2}$ an index of which is 1, $0 \leq y_{org}^{k,1} \leq 255$, $0 \leq y_{org}^{k,2} \leq 255$; reading a value $e_j$ of a j th bit in the key E and a value $w'_i$ of an i th bit from the encrypted information W'; wherein $1 \leq j \leq n$, an initial value of j is 1, $1 \leq i \leq n$, a initial value of i is 1; executing step (1)_6d;

(1)_6d, determining whether $y_{org}^{k,1}$ equals to $y_{org}^{k,2}$, if yes, executing step (1)_6e, else, executing step (1)_6f;

(1)_6e, if $e_j$ is 1, using $w'_i$ to modulate an index of a pixel selected by the coding mode $M_{org}^{k}$ corresponding to the current CU when encoding the current CU and obtaining an index of the pixel after being embedded with hidden information when the current CU goes through encoding; entropy-coding the index of the pixel selected by the coding mode $M_{org}^{k}$ corresponding to the current CU after being embedded with the hidden information when the current CU goes through encoding; completing embedment of the hidden information in the current CU; then j=j+1 and i=i+1, executing step (1)_6i; otherwise, if $e_j$ is 0, then j=j+1, executing step (1)_6i; where "=" is an assignment operator in j=j+1 and i=i+1;

(1)_6f, parsing a depth of the current CU, if the depth is 2 or 3 then executing step (1)_6g; if the depth is 0 or 1, then executing step (1)_6i, depth$\in \{0, 1, 2, 3\}$;

(1)_6g, determining whether a coding mode of a right neighboring CU or a below neighboring CU is the single-depth intra coding mode, if yes, executing step (1)_6i, else, executing step (1)_6h; wherein the right neighboring CU is a neighboring CU which is on a right side of the current CU; the below neighboring CU is a neighboring CU which is below the current CU;

(1)_6h; determining whether a prediction mode of a right above neighboring CU, the right neighboring CU, a right below neighboring CU, a left below neighboring CU and the below neighboring CU of the current CU belongs to a corresponding mode range respectively; if not, using $w'_i$ to modulate the index of the pixel selected by the coding mode $M_{org}^{k}$, corresponding to the current CU when encoding the current CU and obtaining the index of the pixel after being embedded with the hidden information when the current CU goes through encoding; entropy-coding the index of the pixel selected by the coding mode $M_{org}^{k}$, corresponding to the current CU after being embedded with the hidden information when the current CU goes through encoding;

completing the embedment of the hidden information in the current CU; i=i+1, executing step (1)_6i; else, executing step (1)_6i; wherein the right above neighboring CU is a neighboring CU which is above and on the right side of the current CU; the right below neighboring CU is a neighboring CU which is below and on the right side of the current CU; the left below neighboring CU is a neighboring CU which is below and on a left side of the current CU;

(1)_6i, setting a next CU needing to be processed of the current parse block as the current CU and executing step (1)_6b; moving on until a process of all the CU in the current parse block is completed and then executing step (1)_7;

(1)_7, setting a next CTU needing to be parsed of the current frame as a current parse block and executing step (1)_6; moving on until a process of all the CTU in a current frame is completed and then executing step (1)_8;

(1)_8, setting a next frame needing to be parsed in the target video stream $str.bin_{org}$ as a current frame and executing step (1)_4; moving on until a process of all the frames in the target video stream $str.bin_{org}$ is completed and obtaining a video stream $str.bin_{dec}$ which embedded with the hidden information;

(1)_9, transmitting information of an initial value which generates the key E to an information extraction terminal;

An information extraction method comprising following steps of:

(2)_1, setting the video stream which embedded with the hidden information as the target video stream $str.bin_{dec}$;

(2)_2, according to the information of the initial value which generates the key E transmitted from an information embedment terminal, generating a same key E using logistics chaos mapping;

(2)_3, parsing each frame of the target video stream $str.bin_{dec}$ and setting a current frame needing to be parsed in the target video stream $str.bin_{dec}$ as a current frame;

(2)_4, determining whether the current frame is the left view depth image or the right view depth image; if yes, executing step (2)_5, else, executing step (2)_8;

(2)_5, parsing the current frame by the CTU and setting the current CTU needing to be parsed in the current frame as a current parse block; then executing step (2)_6;

(2)_6, according to an optimal splitting mode of the current parse block, parsing every coding mode corresponding to the CU in the current parse block after being split; representing a k th CU in the current parse block by $B_{dec}^{k}$; wherein a corresponding coding mode of $B_{dec}^{k}$ is marked as $M_{dec}^{k}$, k is a positive integer, $k \in [1,64]$; a size of the $B_{dec}^{k}$ is 8×8, 16×16, 32×32 or 64×64, $M_{dec}^{k} \in \{$intra coding mode, single-depth intra coding mode$\}$; then executing following steps of:

(2)_6a, setting a CU under processing of the current parse block as a current CU;

(2)_6b, assuming the current CU is $B_{dec}^{k}$; wherein if the coding model $M_{dec}^{k}$ corresponding to the current CU is the intra coding mode then go to step (2)_6i; if the coding model $M_{dec}^{k}$ corresponding to the current CU is the single-depth intra coding mode then go to step (2)_6c;

(2)_6c, according to the coding theory of the single-depth intra coding mode constructing a pixel candidate list which is marked as $list_{dec}^{k}$ of the coding mode $M_{dec}^{k}$ corresponding to the current CU; wherein $list_{dec}^{k}$ contains 2 pixels; a first pixel is marked as $y_{dec}^{k,1}$ and a second pixel is marked as $y_{dec}^{k,2}$, $0 \leq y_{dec}^{k,1} \leq 255$, $0 \leq y_{dec}^{k,2} \leq 255$; reading a value of a j th bit $e_j$ in the key E, $1 \leq j \leq n$, wherein an initial value of j is 1; executing step (2)_6d;

(2)_6d, determining whether $y_{dec}^{k,1}$ is equal to $y_{dec}^{k,2}$, if yes, executing step (2)_6e, else, executing step (2)_6f;

(2)_6e, if $e_j$ is 1, parsing an index of a pixel selected by the coding mode $M_{dec}^{k}$ corresponding to the current CU after being embedded with hidden information and obtaining an i th bit value of the encrypted information $\hat{w}'_i$; completing an extraction of the hidden information in the current CU; j=j+1 and i=i+1, executing step (2)_6i; otherwise, if $e_j$ is 0, then j=j+1, executing step (2)_6i; wherein 1≤i≤n, an initial value of i is 1, $\hat{w}'_i$ is 0 or 1, "=" is a assignment operator in j=j+1 and i=i+1;

(2)_6f, parsing a depth of the current CU, if the depth is 2 or 3 then executing step (2)_6g; if the depth is 0 or 1, then executing step (2)_6i, depth∈{0, 1, 2, 3};

(2)_6g, determining whether a coding mode of a right neighboring CU or a below neighboring CU is the single-depth intra coding mode, if yes, executing step (2)_6i, else, executing step (2)_6; wherein the right neighboring CU is a neighboring CU which is on the right side of the current CU; the below neighboring CU is a neighboring CU which is below the current CU;

(2)_6h, determining whether a prediction mode of a right above neighboring CU, the right neighboring CU, a right below neighboring CU, a left below neighboring CU and the below neighboring CU of the current CU belongs to a corresponding mode range respectively; if not, parsing an index of a pixel selected by the coding mode $M_{dec}^k$ corresponding to the current CU after being embedded with the hidden information and obtaining an i th bit value of the encrypted information $\hat{w}'_i$; completing an extraction of the hidden information in the current CU; i=i+1, executing step (2)_6i; else, executing step (2)_6i; wherein the right above neighboring CU is a neighboring CU which is above and on the right side of the current CU; the right below neighboring CU is a neighboring CU which is below and on the right side of the current CU; the left below neighboring CU is a neighboring CU which is below and on the left side of the current CU;

(2)_6i, setting a next CU needing to be processed in the current parse block as a current CU and executing step (2)_6b; moving on until a process of all the CU in the current parse block is completed and then executing step (2)_7;

(2)_7, setting a next CTU needing to be parsed of the current frame as a current parse block and executing step (2)_6; moving on until a process of all the CTU in the current frame is completed and then executing step (2)_8;

(2)_8, setting a next frame needing to be parsed in the target video stream str.bin$_{dec}$ as the current frame and executing step (2)_4; moving on until a process of all the frames in the target video stream str.bin$_{dec}$ is completed and completing the extraction of the hidden information;

(2)_9, obtaining n bit values of encrypted information and constructing an encrypted information $\hat{W}'$, $\hat{W}'=\{\hat{w}'_1, \hat{w}'_2, \ldots, \hat{w}'_i, \ldots, \hat{w}'_{n-1}, \hat{w}'_n\}$ processing every bit value of the encrypted information of $\hat{W}'$ and the corresponding bit value of the key E with XOR and generating the decrypted information $\hat{W}$, $\hat{W}=\{\hat{w}_1, \hat{w}_2, \ldots, \hat{w}_i, \ldots, \hat{w}_{n-1}, \hat{w}_n\}$; wherein $\hat{w}'_1, \hat{w}'_2, \hat{w}'_i, \hat{w}'_{n-1}$ and $\hat{w}'_n$ represent a first encrypted bit value, a second encrypted bit value, an i th encrypted bit value, an n-1 th encrypted bit value and an n th encrypted bit value in $\hat{W}'$; the values of $\hat{w}'_1, \hat{w}'_2, \hat{w}'_i, \hat{w}'_{n-1}$ and $\hat{w}'_n$ are 0 or 1; $\hat{w}_1, \hat{w}_2, \hat{w}_i, \hat{w}_{n-1}$ and $\hat{w}_n$ represent a first decrypted bit value, a second decrypted bit value, an i th decrypted bit value, an n-1 th decrypted bit value and an n th decrypted bit value in $\hat{W}$, the values of $\hat{w}_1, \hat{w}_2, \hat{w}_i, \hat{w}_{n-1}$ and $\hat{w}_n$ are 0 or 1.

A process of obtaining an index of the pixel selected by the coding mode $M_{org}^k$ corresponding to the current CU after being embedded with the hidden information by using $w'_i$ to modulate the index of a pixel selected by coding mode $M_{org}^k$ corresponding to the current CU when encoding the current CU in step (1)_6e and step (1)_6 is marking the index of the pixel selected by the coding mode $M_{org}^k$, corresponding to the current CU when encoding the current CU as $I_{org}^k$, and marking the index of the pixel selected by the coding mode $M_{org}^k$, corresponding to the current CU after being embedded with hidden information as $\tilde{I}_{org}^k$, $$\tilde{I}_{org}^k = \begin{cases} I_{org}^k, & \text{if } I_{org}^k = w'_i \\ w'_i, & \text{if } I_{org}^k \neq w'_i \end{cases}.$$

In step (1)_6h, a corresponding mode range of a right above neighboring CU of the current CU is a prediction mode set which comprises a 0th prediction mode and prediction modes from a 2nd to a 10th or a prediction mode set generated by DMM (Depth Modeling Mode) modes; a corresponding mode range of a right neighboring CU of the current CU is a prediction mode set which comprises the 0th prediction mode and prediction modes from a 1st to a 25th or a prediction mode set generated by DMM modes; a corresponding mode range of a right below neighboring CU of the current CU is a prediction mode set which comprises the 0th and the 1st predication modes and prediction modes from a 11th to the 25th or a prediction mode set generated by DMM modes; a corresponding mode range of a left below neighboring CU of the current CU is a prediction mode set which comprises the 0th prediction mode and prediction modes from a 26th to a 34th or a prediction mode set generated by DMM modes; a corresponding mode range of a below neighboring CU of the current CU is a prediction mode set which comprises the 0th and 1st predication modes and prediction modes from the 11th to the 34th or a prediction mode set generated by DMM modes.

A process of parsing the index of the pixel selected by the coding mode $M_{dec}^k$ corresponding to the current CU after being embedded with hidden information and obtaining the i th bit value of the encrypted bit value $\hat{w}'_i$ in step (2)_6e and step (2)_6h is marking the index of the pixel selected by the coding mode $M_{dec}^k$ corresponding to the current CU after being embedded with hidden information as $\tilde{I}_{dec}^k$, $$\hat{w}'_i = \begin{cases} 0, & \text{if } \tilde{I}_{dec}^k = 0 \\ 1, & \text{if } \tilde{I}_{dec}^k = 1 \end{cases}.$$

In step (2)_6, a corresponding mode range of a right above neighboring CU of the current CU is a prediction mode set which comprises a 0th prediction mode and prediction modes from a 2nd to a 10th or a prediction mode set generated by DMM modes; a corresponding mode range of a right neighboring CU of the current CU is a prediction mode set which comprises the 0th prediction mode and prediction modes from a 1st to a 25th or a prediction mode set generated by DMM modes; a corresponding mode range of a right below neighboring CU of the current CU is a prediction mode set which comprises the 0th and the 1st predication modes and prediction modes from a 11th to the 25th or a prediction mode set generated by DMM modes; a corresponding mode range of a left below neighboring CU of the current CU is a prediction mode set which comprises the 0th prediction mode and prediction modes from a 26th to a 34th or a prediction mode set generated by DMM modes; a corresponding mode range of a below neighboring CU of the current CU is a prediction mode set which comprises the 0th and 1st predication modes and prediction modes from the 11th to the 34th or a prediction mode set generated by DMM modes.

Comparing to the conventional technology, the advantage of the present invention lies in:

1) The present invention hides the information in compression domain of 3D-HEVC depth video. The present invention uses the single-depth intra mode which is designed for encoding the smooth region of the depth video in 3D-HEVC coding standard to complete the embedment and extraction of the hidden information. Because the extension of H.264 on 3D video is not equipped with single-depth intra mode, the present invention is completely different from the compression domain information hiding method of the extension of H.264 on 3D video.

2) The present invention generates a pseudo-random binary sequence using logistics chaos mapping as a key during information embedment. The hidden information needing to be embedded is encrypted and the CU for the embedment is positioned by using the key, which improves the security of the present invention effectively.

3) The present invention constructs the pixel candidate list of the coding mode of the CU the coding mode of which is single-depth intra mode. If the two pixels in the candidate list are equal and the information bit value extracted from the key is 1, the index of the pixel of coding mode of the CU is modulated by using the information bit value extracted from the encrypted information; If the two pixels in the candidate list are different and the depth of the CU is 2 or 3 and the coding modes of the right neighboring CU and below neighboring CU are not single-depth intra mode, whether to embed the hidden information in the CU is decided by judging the prediction mode of the right above neighboring CU, right neighboring CU, right below neighboring CU, left below neighboring CU and below CU of the current CU. In such a manner, drifting error is avoided in the hidden information embedment method.

4) In the information extraction part of the present invention, the encrypted information is able to be extracted blinded without the involvement of the original video, which reduces the calculation complexity.

DETAILED DESCRIPTION OF THE PREFERRED EMBODIMENT

Referring to the drawings, according to a preferred embodiment of the present invention is illustrated, wherein The present invention provides a 3D-HEVC depth video information hiding method based on single-depth intra mode, comprises information embedment and information extraction part.

Figure 1A:
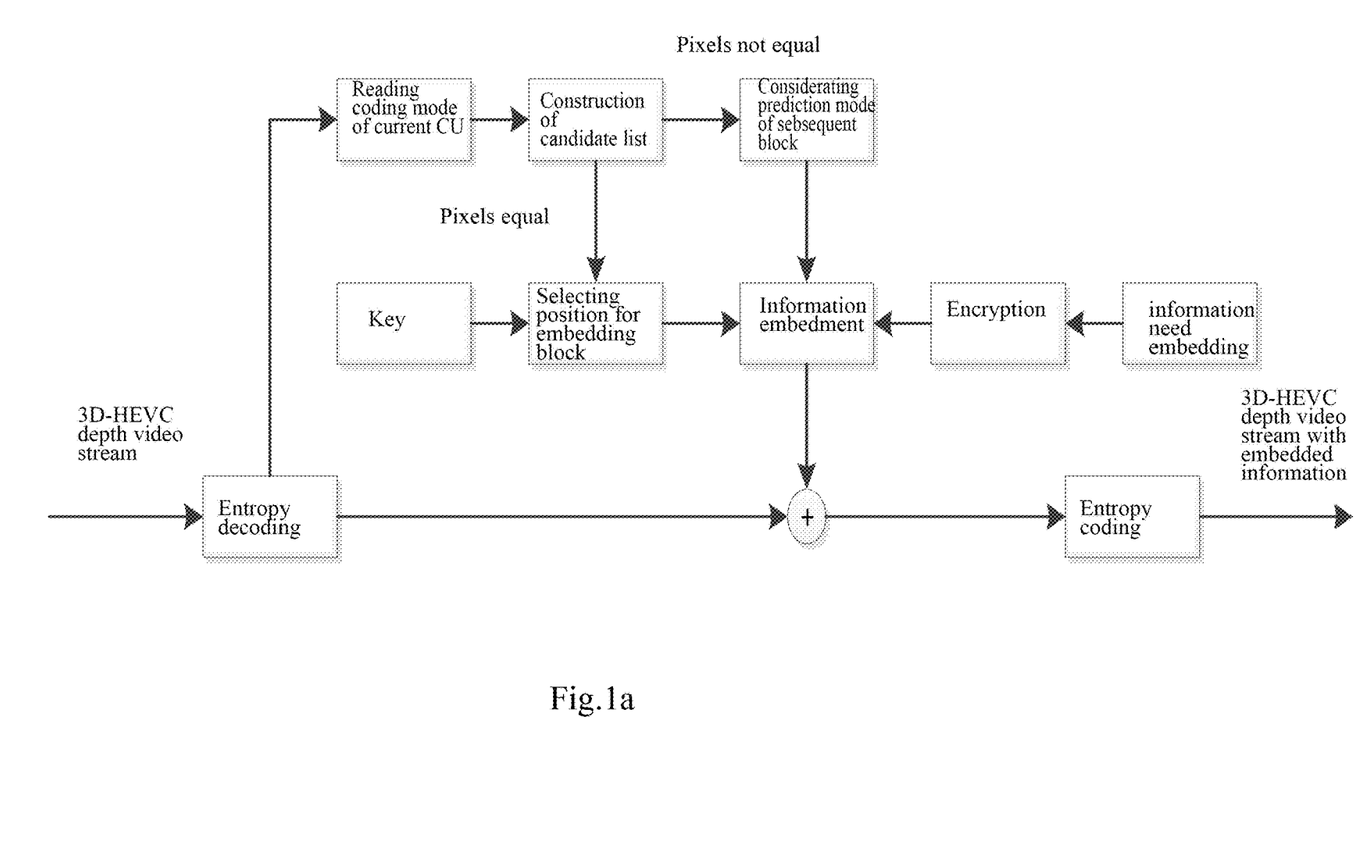
FIG. 1a is a general flow chart of an information embedment part of the present invention.

The information embedment part of the present invention illustrated in FIG. 1a comprises the following steps of:

(1)_1, Let $S_{org}$ represent an original 3D (three dimensional) video, $L_{org}^{c}$ represent a left view color video of $S_{org}$, $L_{org}^{d}$, represent a left view depth video corresponding to $L_{org}^{c}$, $R_{org}^{c}$ represent a right view color video of $S_{org}$, $R_{org}^{d}$, represent a right view depth video corresponding to $R_{org}^{c}$; $L_{org}^{c}$, $L_{org}^{d}$ and $R_{org}^{c}$, or $R_{org}^{d}$ are compressed and encoded through 3D-HEVC standard coding platform to generate target video stream str.bin$_{org}$; M and N denote widths and heights of frames in $L_{org}^{c}$, $L_{org}^{d}$, $R_{org}^{c}$ and $R_{org}^{d}$ respectively; The number of frames contained in the $L_{org}^{c}$, $L_{org}^{d}$, $R_{org}^{c}$ and $R_{org}^{d}$ are same which is all F; W represents hidden information to be embedded, wherein W comprises an n-bit value, $W=\{w_1, w_2, \ldots, w_i, \ldots, w_{n-1}, w_n\}$, $w_1, w_2, w_i, w_{n-1}$ and $w_n$ represent the first bit value, the second bit value, the i-th bit value, the n−1-th bit value and the n-th bit value in W respectively; the values of $w_1, w_2, w_i, w_{n-1}$ and $w_n$ are 0 or 1, $1 \leq i \leq n$, $$n \in \left[1, \frac{M \times N \times F}{8 \times 8}\right].$$

$L_{org}^{c}$, $L_{org}^{d}$, and $R_{org}^{c}$, $R_{org}^{d}$, are encoded in the following sequence, the first frame in the left view color video $L_{org}^{c}$, the first frame in the left view depth video $L_{org}^{d}$, the first frame in the right view color video $R_{org}^{c}$, the first frame of the right view depth video $R_{org}^{d}$, encoding is processed frame by frame until all frames in the $L_{org}^{c}$, $L_{org}^{d}$ and $R_{org}^{c}$, $R_{org}^{d}$ are encoded.

(1)_2, Uses logistics chaos mapping to generate a pseudo-random binary sequence that contains n bits value as a key E, $E=\{e_1, e_2, \ldots, e_i, \ldots, e_{n-1}, e_n\}$; wherein processes every bit value of E and the corresponding bit value of W with XOR to generate encrypted information W', $W'=\{w'_1, w'_2, \ldots, w'_i, \ldots, w'_{n-1}, w'_n\}$; initial information of the key E is given arbitrarily; $e_1, e_2, e_i, e_{n-1}$ and $e_n$ represent a first bit value, a second bit value, an i-th bit value, an n−1-th bit value and an n-th bit value in E respectively; the values of $e_1, e_2, e_i, e_{n-1}$ and $e_n$ are 0 or 1; $w'_1, w'_2, w'_i, w'_{n-1}$ and $w'_n$ represent a first bit value, a second bit value, an i-th bit value, an n−1-th bit value and an n-th bit value in W' respectively; the values of $w'_1, w'_2, w'_i, w'_{n-1}$ and $w'_n$ are 0 or 1, $1 \leq i \leq n$;

(1)_3, Parses each frame of the target video stream str.bin$_{org}$, sets a current frame needing to be parsed in the target video stream str.bin$_{org}$ as the current frame;

(1)_4, Determines whether the current frame is a left view depth frame or a right view depth frame, if yes go to step (1)_5 or else go to step (1)_8;

(1)_5, Parses each CTU (coding tree unit) of the current frame; Sets a current CTU needing to be parsed in the current frame as a current parse block, then go to step (1)_6;

(1)_6, According to the optimal splitting mode of the current parse block, parses every coding mode corresponding to CU (coding unit) in the current parse block after being split. $B_{org}^k$ represents the k th CU in the current parse block; The corresponding coding mode of $B_{org}^k$ is marked as $M_{org}^k$, k is a positive integer, k∈[1, 64], the size of the $B_{org}^k$ is 8×8, 16×16, 32×32 or 64×64, $M_{org}^k$∈{intra coding mode, single-depth intra coding mode}; then go to the following steps:

(1)_6a, Sets the CU under processing of the current parse block as the current CU;

(1)_6b, Assumes the current CU is $B_{org}^k$, if the coding model $M_{org}^k$ corresponding to the current CU is an intra coding mode then go to step (1)_6i; otherwise, if the coding model $M_{org}^k$ corresponding to the current CU is a single-depth intra coding mode then go to step (1)_6c;

(1)_6c, According to the coding theory of the single-depth intra coding mode constructs the pixel candidate list of the coding mode $M_{org}^k$ corresponding to the current CU and marked as $list_{org}^k$ which contains 2 pixels; a first pixel is marked as $y_{org}^{k,1}$ the index of which is 0 and a second pixel is marked as $y_{org}^{k,2}$ the index of which is 1, $0 \le y_{org}^{k,1} \le 255$, $0 \le y_{org}^{k,2} \le 255$; reads a value of j th bit $e_j$ in the key E and reads a value of i th bit $w'_i$ in the encrypted information W', $1 \le j \le n$, an initial value of j is 1, $1 \le i \le n$, an initial value of i is 1; go to step (1)_6d;

(1)_6d, Determines whether $y_{org}^{k,1}$ equals $y_{org}^{k,2}$, if yes, go to step (1)_6e, if no, go to step (1)_6f;

(1)_6e, If $e_j$ is 1, uses $w'_i$ to modulate the index of a pixel selected by the coding mode $M_{org}^k$ corresponding to the current CU when encoding the current CU and gets an index of the pixel selected by the coding mode $M_{org}^k$ corresponding to the current CU after being embedded with hidden information when the current CU goes through encoding, and then entropy-coding of the index of the pixel selected by the coding mode $M_{org}^k$ corresponding to the current CU after being embedded with hidden information when the current CU goes through encoding; the embedment of the hidden information in the current CU is completed by now; j=j+1 and i=i+1, go to step (1)_6i; otherwise, if $e_j$ is 0, then j=j+1, go to step (1)_6i; "=" is a assignment operator in j=j+1 and i=+1;

In the embodiment, the process of obtaining an index of the pixel selected by the coding mode $M_{org}^k$ corresponding to the current CU after being embedded with the hidden information by using $w'_i$ to modulate the index of a pixel selected by coding mode $M_{org}^k$ corresponding to the current CU when encoding the current CU in step (1)_6e is marking the index of the pixel selected by the coding mode $M_{org}^k$ corresponding to the current CU when encoding the current CU as $I_{org}^k$ and marking the index of the pixel selected by the coding mode $M_{org}^k$ corresponding to the current CU after being embedded with hidden information as $\tilde{I}_{org}^k$, $$\tilde{I}_{org}^k = \begin{cases} I_{org}^k, & \text{if } I_{org}^k = w'_i \\ w'_i, & \text{if } I_{org}^k \ne w'_i \end{cases}.$$

(1)_6f, Parses a depth of the current CU, if the depth is 2 or 3 then go to (1)_6g; if the depth is 0 or 1, then go to step (1)_6i, depth∈{0, 1, 2, 3}

(1)_6g, Determines whether the coding mode of a right neighboring CU or a below neighboring CU is single-depth intra coding mode, if yes, go to step (1)_6i, else, go to step (1)_6; the right neighboring CU is a neighboring CU which is on the right side of the current CU; the below neighboring CU is a neighboring CU which is below the current CU;

(1)_6h, Determines whether a prediction mode of the right above neighboring CU, right neighboring CU, right below neighboring CU, left below neighboring CU and below neighboring CU of the current CU belongs to a corresponding mode range respectively; if not, uses $w'_i$ to modulate the index of the pixel selected by coding mode $M_{org}^k$ corresponding to the current CU when encoding the current CU and gets an index of the pixel selected by the coding mode $M_{org}^k$ corresponding to the current CU after being embedded with hidden information when the current CU goes through encoding, and then entropy-coding of the index of the pixel selected by the coding mode $M_{org}^k$ corresponding to the current CU after being embedded with hidden information when the current CU goes through encoding; the embedment of the hidden information in the current CU is completed by now; i=i+1, go to step (1)_6i; else, go to step (1)_6i; the right above neighboring CU is a neighboring CU which is above and on the right side of the current CU; the right below neighboring CU is a neighboring CU which is below and on the right side of the current CU; the left below neighboring CU is a neighboring CU which is below and on the left side of the current CU;

In the embodiment, a corresponding mode range of a right above neighboring CU of the current CU is a prediction mode set which comprises a 0th prediction mode and prediction modes from a 2nd to a 10th or a prediction mode set generated by DMM (Depth Modeling Mode) modes; a corresponding mode range of a right neighboring CU of the current CU is a prediction mode set which comprises the 0th prediction mode and prediction modes from a 1st to a 25th or a prediction mode set generated by DMM modes; a corresponding mode range of a right below neighboring CU of the current CU is a prediction mode set which comprises the 0th and the 1st predication modes and prediction modes from a 11th to the 25th or a prediction mode set generated by DMM modes; a corresponding mode range of a left below neighboring CU of the current CU is a prediction mode set which comprises the 0th prediction mode and prediction modes from a 26th to a 34th or a prediction mode set generated by DMM modes; a corresponding mode range of a below neighboring CU of the current CU is a prediction mode set which comprises the 0th and 1st predication modes and prediction modes from the 11th to the 34th or a prediction mode set generated by DMM modes.

the process of obtaining an index of the pixel selected by the coding mode $M_{org}^k$ corresponding to the current CU after being embedded with the hidden information by using $w'_i$ to modulate the index of a pixel selected by coding mode $M_{org}^k$ corresponding to the current CU when encoding the current CU in step (1)_6 is marking the index of the pixel selected by the coding mode $M_{org}^k$ corresponding to the current CU when encoding the current CU as $I_{org}^k$ and marking the index of the pixel selected by the coding mode $M_{org}^k$ corresponding to the current CU after being embedded with hidden information as $\tilde{I}_{org}^k$, $$\tilde{I}_{org}^k = \begin{cases} I_{org}^k, & \text{if } I_{org}^k = w'_i \\ w'_i, & \text{if } I_{org}^k \ne w'_i \end{cases}.$$

Figure 1B:
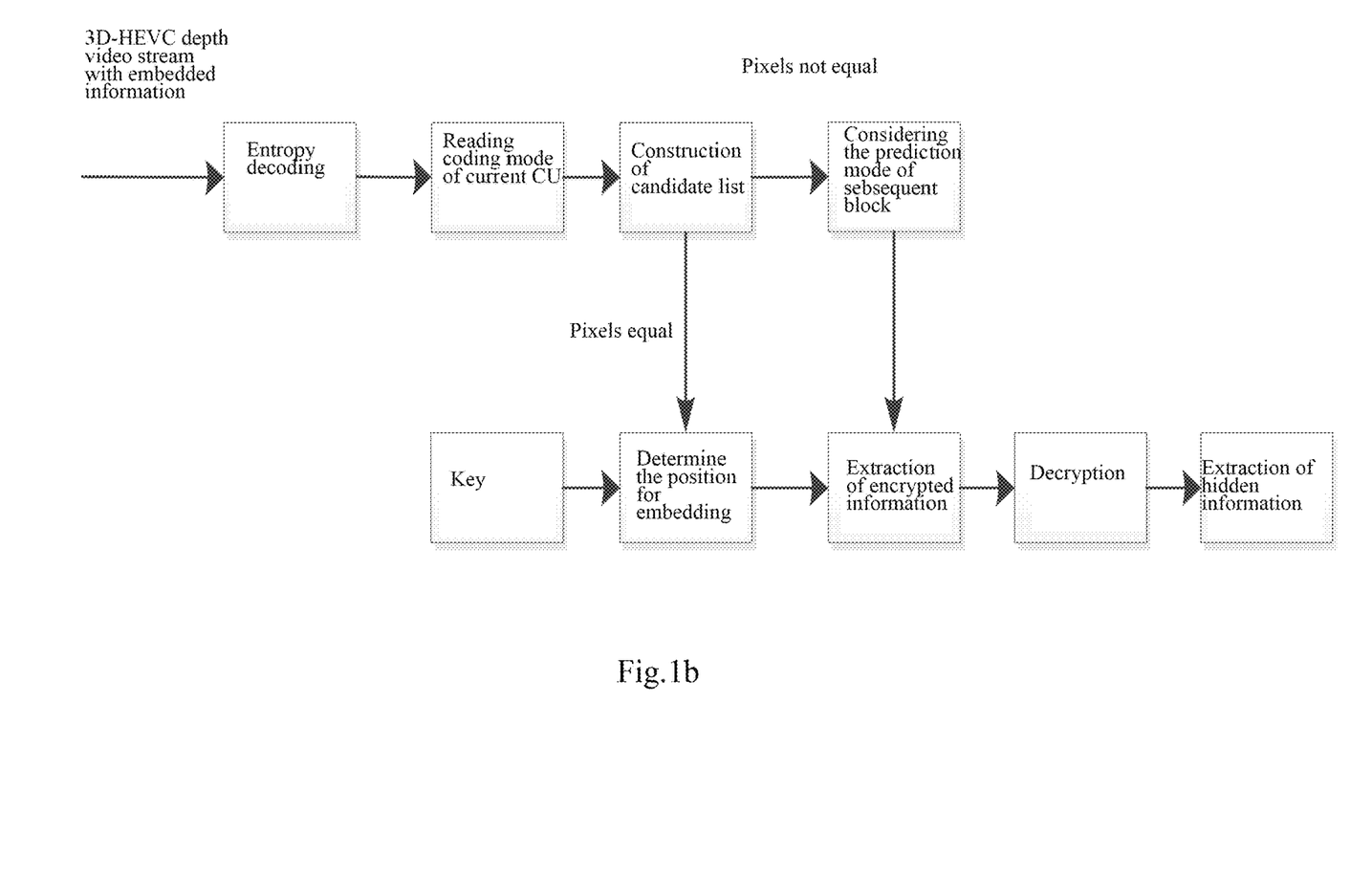
FIG. 1b is a general flow chart of an information extraction part of the present invention.

(1)_6i, Sets a next CU needing to be processed of the current parse block as the current CU and go back to step (1)_6b. Move on until the processing of all the CU in the current parse block is completed and then go to step (1)_7;

(1)_7, Sets the next CTU needing to be parsed of the current frame as the current parse block and go back to step (1)_6; moves on until the processing of all the CTU in the current frame is completed and then go to step (1)_8;

(1)_8, Sets the next frame needing to be parsed in the target video stream str.bin$_{org}$ as the current frame and go back to step (1)_4; moves on until the processing of all the frames in the target video stream str.bin$_{org}$ is completed and obtains the video stream str.bin$_{dec}$ which embedded with the hidden information;

(1)_9, Transmits the information of initial value which generates the key E to an information extraction terminal, with which the same key E is able to be generated at the information extraction terminal.

an information extraction method comprises following steps as illustrated in FIG. 1b:

(2)_1, sets the video stream which embedded with the hidden information as the target video stream str.bin$_{dec}$;

(2)_2, according to the information of the initial value which generates the key E transmitted from the information embedment terminal, generates a same key E using logistics chaos mapping. If the key E generated at the information embedment terminal is directly transmitted to the information extraction terminal, the side-information is too big. Because the process to generate the key E is simple, and with the same initial value the same key E is able to be re-generated, only transmitting the initial value to the information extraction terminal is enough so as to reduce the amount of side-information;

(2)_3, Parses each frame of the target video stream str.bin$_{dec}$ and sets a current frame needing to be parsed in the target video stream str.bin$_{dec}$ as a current frame;

(2)_4, Determines whether the current frame is the left view depth image or the right view depth image; if yes, go to step (2)_5, else, go to step (2)_8;

(2)_5, Parses the current frame by the CTU and sets the current CTU needing to be parsed in the current frame as current parse block, then go to step (2)_6;

(2)_6, According to the optimal splitting mode of the current parse block, parses every coding mode corresponding to the CU in the current parse block after being split. B$_{dec}^k$ represents the k th CU in the current parse block; The corresponding coding mode of B$_{dec}^k$ is marked as M$_{dec}^k$, k is an positive integer, k∈[1, 64], the size of the B$_{dec}^k$ is 8×8, 16×16, 32×32 or 64×64, M$_{dec}^k$∈{intra coding mode, single-depth intra coding mode}; then go to the following steps:

(2)_6a, Sets the CU under processing of the current parse block as the current CU;

(2)_6b, Assumes the current CU is B$_{dec}^k$, if the coding model M$_{dec}^k$ corresponding to the current CU is the intra coding mode then go to step (2)_6i; if the coding model M$_{dec}^k$ corresponding to the current CU is single-depth intra coding mode then go to step (2)_6c;

(2)_6c, According to the coding theory of the single-depth intra coding mode constructs the pixel candidate list of the coding mode M$_{dec}^k$ corresponding to the current CU and marked as list$_{dec}^k$ which contains 2 pixels; a first pixel is marked as y$_{dec}^{k,1}$ and a second pixel is marked as y$_{dec}^{k,2}$, 0≤y$_{dec}^{k,1}$≤255, 0≤y$_{dec}^{k,2}$≤255; reads a value of the j th bit e$_j$ in the key E, 1≤j≤n, an initial value of j is 1, go to step (2)_6d;

(2)_6d, Determines whether y$_{dec}^{k,1}$ equals y$_{dec}^{k,2}$, if yes, go to step (2)_6e, if no, go to step (2)_6f;

(2)_6e, If e$_j$ is 1, parses the index of a pixel selected by the coding mode M$_{dec}^k$ corresponding to the current CU after being embedded with hidden information and gets the i th bit value of the encrypted information ŵ'$_i$, the extraction of the hidden information in the current CU is completed by now; j=j+1 and i=i+1, go to step (2)_6i; if e$_j$ is 0, then j=j+1, go to step (2)_6i; 1≤i≤n, the initial value of i is 1, ŵ'$_i$ is 0 or 1, "=" is a assignment operator in j=j+1 and i=i+1;

In the embodiment, a process of parsing the index of the pixel selected by the coding mode M$_{dec}^k$ corresponding to the current CU after being embedded with hidden information and obtaining the i th bit value of the encrypted bit value ŵ'$_i$ in step (2)_6e is marking the index of the pixel selected by the coding mode M$_{dec}^k$ corresponding to the current CU after being embedded with hidden information as Ĩ$_{dec}^k$, $$\hat{w}'_i = \begin{cases} 0, & \text{if } \tilde{I}_{dec}^k = 0 \\ 1, & \text{if } \tilde{I}_{dec}^k = 1 \end{cases}.$$

(2)_6f, Resolves a depth of the current CU, if the depth is 2 or 3 then go to step (2)_6g; if the depth is 0 or 1, then go to step (2)_6i, depth∈{0, 1, 2, 3};

(2)_6g, Determines whether the coding mode of a right neighboring CU or a below neighboring CU is the single-depth intra coding mode, if yes, go to step (2)_6i, else, go to step (2)_6; the right neighboring CU is a neighboring CU which is on the right side of the current CU; the below neighboring CU is a neighboring CU which is below the current CU;

(2)_6h, Determines whether a prediction mode of the right above neighboring CU, right neighboring CU, right below neighboring CU, left below neighboring CU and below neighboring CU of the current CU belongs to a corresponding mode range respectively; if not, parses the index of a pixel selected by the coding mode M$_{dec}^k$ corresponding to the current CU after being embedded with hidden information and gets the i th bit value of the encrypted information ŵ'$_i$, the extraction of the hidden information in the current CU is completed by now; i=i+1, go to step (2)_6i; else, go to step (2)_6i; the right above neighboring CU is a neighboring CU which is above and on the right side of the current CU; the right below neighboring CU is a neighboring CU which is below and on the right side of the current CU; the left below neighboring CU is a neighboring CU which is below and on the left side of the current CU;

In the embodiment, a corresponding mode range of a right above neighboring CU of the current CU is a prediction mode set which comprises a 0th prediction mode and prediction modes from a 2nd to a 10th or a prediction mode set generated by DMM modes; a corresponding mode range of a right neighboring CU of the current CU is a prediction mode set which comprises the 0th prediction mode and prediction modes from a 1st to a 25th or a prediction mode set generated by DMM modes; a corresponding mode range of a right below neighboring CU of the current CU is a prediction mode set which comprises the 0th and the 1st predication modes and prediction modes from a 11th to the 25th or a prediction mode set generated by DMM modes; a corresponding mode range of a left below neighboring CU of the current CU is a prediction mode set which comprises the 0th prediction mode and prediction modes from a 26th to a 34th or a prediction mode set generated by DMM modes; a corresponding mode range of a below neighboring CU of the current CU is a prediction mode set which comprises the 0th and 1st predication modes and prediction modes from the 11th to the 34th or a prediction mode set generated by DMM modes.

A process of parsing the index of the pixel selected by the coding mode M$_{dec}^k$ corresponding to the current CU after being embedded with hidden information and obtaining the i th bit value of the encrypted bit value $\hat{w}'_i$ in step (2)_6 is marking the index of the pixel selected by the coding mode $M_{dec}^k$ corresponding to the current CU after being embedded with hidden information as $\tilde{I}_{dec}^k$, $$\hat{w}'_i = \begin{cases} 0, & \text{if } \tilde{I}_{dec}^k = 0 \\ 1, & \text{if } \tilde{I}_{dec}^k = 1 \end{cases}.$$

(2)_6i, Sets a next CU needing to be processed in the current parse block as the current CU and go back to step (2)_6b. Move on until the process of all the CU in the current parse block is completed and then go to step (2)_7;

(2)_7, Sets the next CTU needing to be parsed of the current frame as the current parse block and go back to step (2)_6; move on until the process of all the CTU in the current frame is completed and then go to step (2)_8;

(2)_8, Sets the next frame needing to be parsed in the target video stream str.bin$_{dec}$ as the current frame and go back to step (2)_4; move on until the process of all the frames in the target video stream str.bin$_{dec}$ is completed and the extraction of the hidden information is completed;

(2)_9, gets n bit values of encrypted information and constructs the encrypted information $\hat{W}'$, $\hat{W}'=\{\hat{w}'_1, \hat{w}'_2, \ldots, \hat{w}'_i, \ldots, \hat{w}'_{n-1}, \hat{w}'_n\}$; processes every bit value of the encrypted information of $\hat{W}'$ and the corresponding bit value of the key E with XOR and generates the decrypted information $\hat{W}$, $\hat{W}=\{\hat{w}_1, \hat{w}_2, \ldots, \hat{w}_i, \ldots, \hat{w}_{n-1}, \hat{w}_n\}$; $w'_1$, $w'_2$, $w'_i$, $w'_{n-1}$ and $w'_n$ and represent the first encrypted bit value, the second encrypted bit value, the i th encrypted bit value, the n−1 th encrypted bit value and the n th encrypted bit value in $\hat{W}'$; the values of $w'_1$, $w'_2$, $w'_i$, $w'_{n-1}$ and $w'_n$ are 0 or 1; $\hat{w}_1$, $\hat{w}_2$, $\hat{w}_i$, $\hat{w}_{n-1}$ and $\hat{w}_n$ represent a first decrypted bit value, a second decrypted bit value, an i th decrypted bit value, an n−1 th decrypted bit value and an n th decrypted bit value in $\hat{W}$, the values of $\hat{w}'_1$, $\hat{w}'_2$, $\hat{w}'_i$, $\hat{w}'_{n-1}$ and $\hat{w}'_n$ are 0 or 1.

In order to test the effectiveness and feasibility of the present invention the following experiment is carried out:

The adopted test sequences are the 3$^{rd}$ and 5$^{th}$ viewpoints of Balloons stereo video sequence, the 2$^{nd}$ and 4$^{th}$ viewpoints of Newspaper stereo video, the 3$^{rd}$ and 5$^{th}$ viewpoint of Kendo stereo video, the 1$^{st}$ and 9$^{th}$ viewpoints of Shark stereo video, the 3$^{rd}$ and 5$^{th}$ viewpoints of PoznanStreet stereo video and the 1$^{st}$ and 9$^{th}$ viewpoints of UndoDancer stereo video. Resolution of the first three of the sequence is 1024×768 and the last three is 1920×1088. HTM13.0 is adopted as the test software which is the coding platform based on 3D-HEVC standard. Use All-intra profile to encode 100 frames. The encoding QP (quantization parameter) of the color video is 25, 30, 35 and 40 while QP of the corresponding depth video is 34, 39, 42 and 45. Other configuration parameters are the default value of the platform. Below is an evaluation of the performance of the present invention on aspect of embedding capacity, bit rate, the imperceptibility of the stereo video sequence and etc.

1) Embedding Capacity and Bitrate Change

The embedding capacity and bitrate change is the main indicator for the performance of the information hiding method. Table 1 shows the test result of the embedding capacity and bitrate change of the present invention being applied to Balloons, Newspaper, Kendo, Shark, PoznanStreet and UndoDancer stereo video sequences. Table 1 gives the means of the embedding capacity of all the depth frames. The bitrate change BRI is defined as $$BRI = \frac{R_{pro} - R_{org}}{R_{org}} \times 100\%,$$

wherein $R_{pro}$ represents the bitrate of the encoded video stream processed with the present invention and $R_{org}$ is the bitrate of the original encoded video stream.

The embedding capacity is related to resolution of the stereo video sequence and QP of the encoding. The embedding capacity is proportional to the resolution while is inversely proportional to the QP. Higher resolution indicates more CU which is able to be embedding carrier. Increased QP influences the selection of the optimal splitting mode and thus has big influence on rate distortion of the encoding. The average embedding capacity per frame of depth image is 244 bit under all the QP. The change rate of the bit rate of the stereo video sequence is 0.03%-0.25% before and after the information embedment. The average change rate is 0.12% which indicates that the embedding capacity of the present invention is high and the present invention has small influence on the bitrate.

TABLE 1

Test result of the embedding capacity and bit rate change rate of the present invention

| Stereo video sequence | Resolution | QP | Embedding capacity (bit/frame) | Bitrate (kbps) Original encoding | Bitrate (kbps) The present invention | Change rate |
|---|---|---|---|---|---|---|
| Balloons | 1024 × 768 | 25 | 348 | 15786.019 | 15807.365 | 0.14% |
|  |  | 30 | 172 | 9688.238 | 9701.158 | 0.13% |
|  |  | 35 | 102 | 5934.821 | 5943.029 | 0.14% |
|  |  | 40 | 60 | 3639.576 | 3644.455 | 0.13% |
| Newspaper | 1024 × 768 | 25 | 396 | 23593.044 | 23614.853 | 0.09% |
|  |  | 30 | 237 | 13293.386 | 13309.423 | 0.12% |
|  |  | 35 | 160 | 7607.429 | 7619.117 | 0.15% |
|  |  | 40 | 100 | 4392.242 | 4399.615 | 0.17% |
| Kendo | 1024 × 768 | 25 | 263 | 10189.21 | 10207.306 | 0.18% |
|  |  | 30 | 103 | 6132.725 | 6141.086 | 0.14% |
|  |  | 35 | 54 | 3721.435 | 3725.902 | 0.12% |
|  |  | 40 | 37 | 2297.899 | 2300.882 | 0.13% |

TABLE 1-continued

Test result of the embedding capacity and bit rate change rate of the present invention

| Stereo video sequence | Resolution | QP | Embedding capacity (bit/frame) | Bitrate (kbps) | | Change rate |
|---|---|---|---|---|---|---|
| | | | | Original encoding | The present invention | |
| Shark | 1920 × 1088 | 25 | 803 | 53949.878 | 54032.436 | 0.15% |
| | | 30 | 554 | 30434.542 | 30488.789 | 0.18% |
| | | 35 | 358 | 15916.339 | 15949.505 | 0.21% |
| | | 40 | 227 | 7851.662 | 7871.249 | 0.25% |
| PoznanStreet | 1920 × 1088 | 25 | 551 | 47256.6 | 47280.99 | 0.05% |
| | | 30 | 210 | 23110.58 | 23120.44 | 0.04% |
| | | 35 | 121 | 11800.81 | 11807.51 | 0.06% |
| | | 40 | 66 | 6325.92 | 6328.334 | 0.04% |
| UndoDancer | 1920 × 1088 | 25 | 314 | 73108.164 | 73129.024 | 0.03% |
| | | 30 | 250 | 37428.284 | 37446.912 | 0.05% |
| | | 35 | 198 | 16872.418 | 16886.584 | 0.08% |
| | | 40 | 177 | 7130.218 | 7139.852 | 0.13% |

2) The Imperceptibility of the Stereo Video Sequence

Figure 2A:
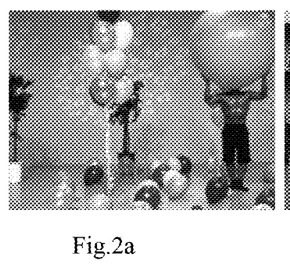
FIG. 2a is a first frame of the 4$^{th}$ viewpoint rendered from the Balloons stereo video stream without embedding hidden information.
Figure 2B:
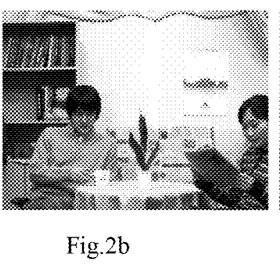
FIG. 2b is a first frame of the 3$^{rd}$ viewpoint rendered from the Newspaper stereo video stream without embedding hidden information.
Figure 2C:
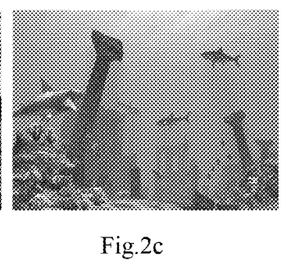
FIG. 2c is a first frame of the 5$^{th}$ viewpoint rendered from the Shark stereo video stream without embedding hidden information.
Figure 2D:
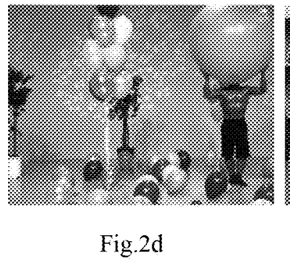
FIG. 2d is a first frame of the 4$^{th}$ viewpoint rendered from the Balloons stereo video stream embedded with hidden information through the present invention.
Figure 2E:
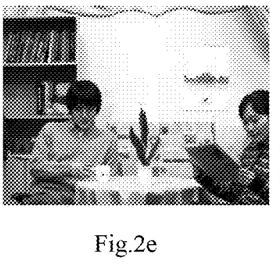
FIG. 2e is a first frame of the 3$^{rd}$ viewpoint rendered from the Newspaper stereo video stream embedded with hidden information through the present invention.
Figure 2F:
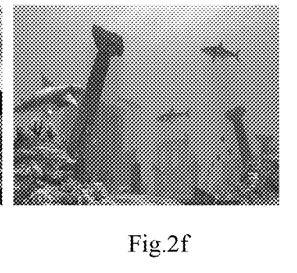
FIG. 2f is a first frame of the 5$^{th}$ viewpoint rendered from the Shark stereo video stream embedded with hidden information through the present invention.

The imperceptibility is another performance indicator of the information hiding method for the stereo video, which indicates whether there is an obvious decline in quality of the stereo video after embedding the information. The depth video is not for directly view, but for virtual view point rendering. So a change in the quality of depth video after embedding is able to be displayed by the quality of the rendered viewpoint. Taking Balloons, Newspaper and Shark stereo video sequences as an example, FIG. 2a shows the first frame of the $4^{th}$ viewpoint rendered with the decoded $3^{rd}$ and $5^{th}$ viewpoints of the Balloons stereo video sequence without embedding hidden information. FIG. 2b shows the first frame of the $3^{rd}$ viewpoint rendered with the decoded $2^{nd}$ and $4^{th}$ viewpoints of the Newspaper stereo video sequence without embedding hidden information. FIG. 2c shows the first frame of the $5^{th}$ viewpoint rendered with the decoded $1^{st}$ and $9^{th}$ viewpoints of the Shark stereo video sequence without embedding hidden information. FIG. 2d gives the first frame of the $4^{th}$ viewpoint rendered with the decoded $3^{rd}$ and $5^{th}$ viewpoints of the Balloons stereo video sequence embedded hidden information with the present invention. FIG. 2e gives the first frame of the $3^{rd}$ viewpoint rendered with the decoded $2^{nd}$ and $4^{th}$ viewpoints of the Newspaper stereo video sequence embedded hidden information with the present invention. FIG. 2f gives the first frame of the $5^{th}$ viewpoint rendered with the decoded $1^{st}$ and $9^{th}$ viewpoints of the Shark stereo video sequence embedded hidden information with the present invention. Comparing FIG. 2a with FIG. 2d, FIG. 2b with FIG. 2e and FIG. 2c with FIG. 2f there is no obviously rendering viewpoint distortion after embedding the hidden information, which proves that the imperceptibility of the present invention is good.

In addition to the subjective assessment, the change in quality of the stereo video before and after the embedding is able to be evaluated by objective assessment. PSNR (Peak Signal-Noise-Ratio) and SSIM (Structural similarity index) are adopted here. Table 2 gives the PSNRs and SSIMs of the viewpoints rendered with the decoded stereo video sequences which have been embedded with hidden information by the present invention, as well as the PSNRs and SSIMs of the viewpoints rendered with the decoded stereo video sequences without embedding hidden information. The formula for variation of PSNR and SSIM before and after embedding the hidden information ΔPSNR and ΔSSIM is $\Delta PSNR = PSNR_{pro} - PSNR_{org}$ and $\Delta SSIM = SSIM_{pro} - SSIM_{org}$ respectively. $PSNR_{pro}$ and $SSIM_{pro}$ represent the PSNR and SSIM between original viewpoint and the viewpoint rendering from the stereo video sequence generated by decoded video stream processed by the present invention, respectively. $PSNR_{org}$ and $SSIM_{org}$ represent the PSNR and SSIM between original viewpoint and the viewpoint rendering from the stereo video sequence generated by decoded video stream. The experiment evaluates the imperceptibility of the stereo video by the value of ΔPSNR and ΔSSIM.

Table 2 shows the quality of the viewpoint rendering from the decoded stereo video sequence varies under different QP. The higher QP results the lower quality of the rendered viewpoint, because the increase in QP causes higher compression which induce high distortion level and low quality of viewpoint rendering. The variation of absolute value of PSNR of the viewpoint rendered with stereo video sequence which is decoded from the video stream before and after the embedding is within 0~0.0139 dB. The PSNR of the rendered viewpoint is reduced an average 0.00141 dB after being processed by the present invention comparing to the video stream not processed by the present invention, which proves that the influence of the present invention on the quality of the rendered viewpoint is slight. The PSNR may differ from the subjective perception so Table 2 also lists SSIM. The SSIM of the rendered viewpoint is reduced an average 0.000006 after being processed by the present invention comparing to the video stream not processed by the present invention, which further indicates the present invention has good imperceptibility for the stereo video. When the pixels in the candidate list of the single-depth intra coding mode of the CU are equal, the present invention adopts the hidden information to modulate the index of the pixels in the candidate list which will not cause any distortion for the current CU. When the pixels in the candidate list of the single-depth intra coding mode of the CU are different, the present invention only distorts the current CU because drift error is taken into account.

TABLE 2

PSNR and SSIM of the rendered viewpoints generated with the video stream being processed by the present invention comparing to the video stream without hidden information

| Stereo video sequence | QP | PSNR(dB) | | | SSIM | | |
|---|---|---|---|---|---|---|---|
| | | $PSNR_{pro}$ | $PSNR_{org}$ | $\Delta PSNR$ | $SSIM_{pro}$ | $SSIM_{org}$ | $\Delta SSIM$ |
| Balloons | 25 | 35.8779 | 35.8788 | −0.0009 | 0.967303 | 0.967305 | −0.000002 |
| | 30 | 35.4895 | 35.5034 | −0.0139 | 0.962719 | 0.962765 | −0.000046 |
| | 35 | 34.778 | 34.7798 | −0.0018 | 0.953266 | 0.95327 | −0.000004 |
| | 40 | 33.5025 | 33.5038 | −0.0013 | 0.93547 | 0.935475 | −0.000005 |
| Newspaper | 25 | 31.999 | 32.0011 | −0.0021 | 0.936266 | 0.936284 | −0.000018 |
| | 30 | 31.8229 | 31.8233 | −0.0004 | 0.928699 | 0.928705 | −0.000006 |
| | 35 | 31.4768 | 31.4793 | −0.0025 | 0.914362 | 0.914386 | −0.000024 |
| | 40 | 30.7325 | 30.7325 | 0 | 0.892702 | 0.892703 | −0.000001 |
| Kendo | 25 | 38.4738 | 38.474 | −0.0002 | 0.973611 | 0.973612 | −0.000001 |
| | 30 | 38.0236 | 38.0236 | 0 | 0.970532 | 0.970533 | −0.000001 |
| | 35 | 37.1934 | 37.1934 | 0 | 0.964527 | 0.964526 | 0.000001 |
| | 40 | 35.8185 | 35.8186 | −0.0001 | 0.954073 | 0.954073 | 0 |
| Shark | 25 | 41.23 | 41.2302 | −0.0002 | 0.978532 | 0.978533 | −0.000001 |
| | 30 | 39.127 | 39.1272 | −0.0002 | 0.966029 | 0.96603 | −0.000001 |
| | 35 | 36.4303 | 36.4304 | −0.0001 | 0.942252 | 0.942253 | −0.000001 |
| | 40 | 33.638 | 33.6382 | −0.0002 | 0.90372 | 0.903722 | −0.000002 |
| PoznanStreet | 25 | 35.4596 | 35.4596 | 0 | 0.928579 | 0.92858 | −0.000001 |
| | 30 | 35.1546 | 35.1548 | −0.0002 | 0.914319 | 0.914321 | −0.000002 |
| | 35 | 34.2796 | 34.2894 | −0.0098 | 0.88978 | 0.889801 | −0.000021 |
| | 40 | 32.8565 | 32.8565 | 0 | 0.857639 | 0.857639 | 0 |
| UndoDancer | 25 | 36.9156 | 36.9156 | 0 | 0.955244 | 0.955244 | 0 |
| | 30 | 35.0647 | 35.0647 | 0 | 0.919827 | 0.919827 | 0 |
| | 35 | 32.7245 | 32.7245 | 0 | 0.860651 | 0.860651 | 0 |
| | 40 | 30.393 | 30.393 | 0 | 0.800526 | 0.800526 | 0 |

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A 3D-HEVC (3-Dimensional extension of High Efficiency Video Coding) depth video information hiding method based on single-depth intra mode, comprising information embedment and information extraction; wherein, steps for the information embedment are as follow:

(1)_1, representing an original 3D (three dimensional) video by $S_{org}$, denoting a left view color video of $S_{org}$ as $L_{org}^c$, denoting a left view depth video corresponding to $L_{org}^c$ as $L_{org}^d$, denoting a right view color video of $S_{org}$ as $R_{org}^c$, denoting a right view depth video corresponding to R $L_{org}^c$ as $R_{org}^d$; wherein $L_{org}^c$, $L_{org}^d$ and $R_{org}^c$, $R_{org}^d$ are compressed and encoded through a 3D-HEVC standard coding platform to generate a target video stream str.bin$_{org}$; M and N denote widths and heights of frames in $L_{org}^c$, $L_{org}^d$, $R_{org}^c$ and $R_{org}^d$ respectively; F denotes the number of frames contained in the $L_{org}^c$, $L_{org}^d$, $R_{org}^c$ or $R_{org}^d$; W represents hidden information to be embedded, wherein W comprises an n-bit value, $W=\{w_1, w_2, \ldots, w_i, \ldots, w_{n-1}, w_n\}$, $w_1$, $w_2$, $w_i$, $w_{n-1}$, $w_n$ represent a first bit value, a second bit value, an i-th bit value, an n−1-th bit value and an n-th bit value in W respectively; values of $w_1$, $w_2$, $w_i$, $w_{n-1}$ and $w_n$ are 0 or 1, $1 \le i \le n$, $$n \in \left[1, \frac{M \times N \times F}{8 \times 8}\right];$$

(1)_2, using logistics chaos mapping to generate a pseudo-random binary sequence that contains n bits value as a key E, $E=\{e_1, e_2, \ldots, e_i, \ldots, e_{n-1}, e_n\}$; processing every bit value of E and the corresponding bit value of W with XOR to generate encrypted information W', $W'=\{w'_1, w'_2, \ldots, w'_i, \ldots, w'_{n-1}, w'_n\}$; wherein initial information of the key E is given arbitrarily; $e_1$, $e_2$, $e_i$, $e_{n-1}$ and $e_n$ represent a first bit value, a second bit value, an i-th bit value, an n−1-th bit value and an n-th bit value in E respectively; the values of $e_1$, $e_2$, $e_i$, $e_{n-1}$ and $e_n$ are 0 or 1; $w'_1$, $w'_2$, $w'_i$, $w'_{n-1}$ and $w'_n$ represent a first bit value, a second bit value, an i-th bit value, an n−1-th bit value and an n-th bit value in W' respectively; the values of $w'_1$, $w'_2$, $w'_i$, $w'_{n-1}$ and $w'_n$ are 0 or 1, $1 \le i \le n$;

(1)_3, parsing each frame of the target video stream str.bin$_{org}$ and setting a current frame needing to be parsed in the target video stream str.bin$_{org}$ as a current frame;

(1)_4, determining whether the current frame is a left view depth frame or a right view depth frame, if yes executing step (1)_5 or else step (1)_8;

(1)_5, parsing each CTU (coding tree unit) of the current frame and setting a current CTU needing to be parsed in the current frame as a current parse block, then executing step (1)_6;

(1)_6 according to an optimal splitting mode of the current parse block, parsing every coding mode corresponding to CU (coding unit) in the current parse block after being split; representing a k th CU in the current parse block by $B_{org}^k$; wherein a corresponding coding mode of $B_{org}^k$, is marked as $M_{org}^k$, k is a positive integer, k∈[1,64]; a size of the $B_{org}^k$ is 8×8, 16×16, 32×32 or 64×64, $M_{org}^k$∈{intra coding mode, single-depth intra coding mode}; executing the following steps of:

(1)_6a, setting a CU under processing in the current parse block as a current CU;

(1)_6b, assuming the current CU is $B_{org}^k$, wherein if the coding model $M_{org}^k$, corresponding to the current CU is an intra coding mode then executing step (1)_6i; if the coding model $M_{org}^k$, corresponding to the current CU is a single-depth intra coding mode then executing step (1)_6c;

(1)_6c, according to a coding theory of a single-depth intra coding mode, constructing a pixel candidate list of the coding mode $M_{org}^k$ corresponding to the current CU, which is marked as $list_{org}^k$; wherein $list_{org}^k$ contains 2 pixels; a first pixel is marked as $y_{org}^{k,1}$, an index of which is 0; and a second pixel is marked as $y_{org}^{k,2}$, an index of which is 1, $0 \leq y_{org}^{k,1} \leq 255$, $0 \leq y_{org}^{k,2} \leq 255$; reading a value $e_j$ of a j th bit in the key E and a value $w'_i$ of an i th bit from the encrypted information W'; wherein $1 \leq j \leq n$, an initial value of j is 1, $1 \leq i \leq n$, a initial value of i is 1; executing step (1)_6d;

(1)_6d, determining whether $y_{org}^{k,1}$ equals to $y_{org}^{k,2}$, if yes, executing step (1)_6e, else, executing step (1)_6f;

(1)_6e, if $e_j$ is 1, using $w'_i$ to modulate an index of a pixel selected by the coding mode $M_{org}^k$ corresponding to the current CU when encoding the current CU and obtaining an index of the pixel after being embedded with hidden information when the current CU goes through encoding; entropy-coding the index of the pixel selected by the coding mode $M_{org}^k$ corresponding to the current CU after being embedded with the hidden information when the current CU goes through encoding; completing embedment of the hidden information in the current CU; then j=j+1 and i=i+1, executing step (1)_6i; otherwise, if e is 0, then j=j+1, executing step (1)_6i; wherein "=" is an assignment operator in j=j+1 and i=i+1;

(1)_6f, parsing a depth of the current CU, if the depth is 2 or 3 then executing step (1)_6g; if the depth is 0 or 1, then executing step (1)_6i, depth∈{0, 1, 2, 3};

(1)_6g, determining whether a coding mode of a right neighboring CU or a below neighboring CU is the single-depth intra coding mode, if yes, executing step (1)_6i, else, executing step (1)_6; wherein the right neighboring CU is a neighboring CU which is on a right side of the current CU; the below neighboring CU is a neighboring CU which is below the current CU;

(1)_6h; determining whether a prediction mode of a right above neighboring CU, the right neighboring CU, a right below neighboring CU, a left below neighboring CU and the below neighboring CU of the current CU belongs to a corresponding mode range respectively; if not, using $w'_i$ to modulate the index of the pixel selected by the coding mode $M_{org}^k$, corresponding to the current CU when encoding the current CU and obtaining the index of the pixel after being embedded with the hidden information when the current CU goes through encoding; entropy-coding the index of the pixel selected by the coding mode $M_{org}^k$, corresponding to the current CU after being embedded with the hidden information when the current CU goes through encoding; completing the embedment of the hidden information in the current CU; i=i+1, executing step (1)_6i; else, executing step (1)_6i; wherein the right above neighboring CU is a neighboring CU which is above and on the right side of the current CU; the right below neighboring CU is a neighboring CU which is below and on the right side of the current CU; the left below neighboring CU is a neighboring CU which is below and on a left side of the current CU;

(1)_6i, setting a next CU needing to be processed of the current parse block as the current CU and executing step (1)_6b; moving on until a process of all the CU in the current parse block is completed and then executing step (1)_7;

(1)_7, setting a next CTU needing to be parsed of the current frame as a current parse block and executing step (1)_6; moving on until a process of all the CTU in a current frame is completed and then executing step (1)_8;

(1)_8, setting a next frame needing to be parsed in the target video stream $str.bin_{org}$ as a current frame and executing step (1)_4; moving on until a process of all the frames in the target video stream $str.bin_{org}$ is completed and obtaining a video stream $str.bin_{dec}$ which embedded with the hidden information;

(1)_9, transmitting information of an initial value which generates the key E to an information extraction terminal;

an information extraction method comprising following steps of:

(2)_1, setting the video stream which embedded with the hidden information as the target video stream $str.bin_{dec}$;

(2)_2, according to the information of the initial value which generates the key E transmitted from an information embedment terminal, generating a same key E using logistics chaos mapping;

(2)_3, parsing each frame of the target video stream $str.bin_{dec}$ and setting a current frame needing to be parsed in the target video stream $str.bin_{dec}$ as a current frame;

(2)_4, determining whether the current frame is the left view depth image or the right view depth image; if yes, executing step (2)_5, else, executing step (2)_8;

(2)_5, parsing the current frame by the CTU and setting the current CTU needing to be parsed in the current frame as a current parse block; then executing step (2)_6;

(2)_6, according to an optimal splitting mode of the current parse block, parsing every coding mode corresponding to the CU in the current parse block after being split; representing a k th CU in the current parse block by $B_{dec}^k$; wherein a corresponding coding mode of $B_{dec}^k$ is marked as $M_{dec}^k$, k is a positive integer, k∈[1,64]; a size of the $B_{dec}^k$ is 8×8, 16×16, 32×32 or 64×64, $M_{dec}^k$∈{intra coding mode, single-depth intra coding mode}; then executing following steps of:

(2)_6a, setting a CU under processing of the current parse block as a current CU;

(2)_6b, assuming the current CU is $B_{dec}^k$; wherein if the coding model $M_{dec}^k$ corresponding to the current CU is the intra coding mode then go to step (2)_6i; if the coding model $M_{dec}^k$ corresponding to the current CU is the single-depth intra coding mode then go to step (2)_6c;

(2)_6c, according to the coding theory of the single-depth intra coding mode constructing a pixel candidate list which is marked as $list_{dec}^k$ of the coding mode $M_{dec}^k$ corresponding to the current CU; wherein $list_{dec}^k$ contains 2 pixels; a first pixel is marked as $y_{dec}^{k,1}$ and a second pixel is marked as $y_{dec}^{k,2}$, $0 \leq y_{dec}^{k,1} \leq 255$, $0 \le y_{dec}^{k,2} \le 255$; reading a value of a j th bit $e_j$ in the key E, $1 \le j \le n$, wherein an initial value of j is 1; executing step (2)_6d;

(2)_6d, determining whether $y_{dec}^{k,1}$ is equal to $y_{dec}^{k,2}$, if yes, executing step (2)_6e, else, executing step (2)_6f;

(2)_6e, if $e_j$ is 1, parsing an index of a pixel selected by the coding mode $M_{dec}^k$ corresponding to the current CU after being embedded with hidden information and obtaining an i th bit value of the encrypted information $\hat{w}'_i$; completing an extraction of the hidden information in the current CU; j=j+1 and i=i+1, executing step (2)_6i; otherwise, if $e_j$ is 0, then j=j+1, executing step (2)_6i; wherein $1 \le i \le n$, an initial value of i is 1, $\hat{w}'_i$ is 0 or 1, "=" is a assignment operator in j=j+1 and i=i+1;

(2)_6f, parsing a depth of the current CU, if the depth is 2 or 3 then executing step (2)_6g; if the depth is 0 or 1, then executing step (2)_6i, depth∈{0, 1, 2, 3};

(2)_6g, determining whether a coding mode of a right neighboring CU or a below neighboring CU is the single-depth intra coding mode, if yes, executing step (2)_6i, else, executing step (2)_6; wherein the right neighboring CU is a neighboring CU which is on the right side of the current CU; the below neighboring CU is a neighboring CU which is below the current CU;

(2)_6h, determining whether a prediction mode of a right above neighboring CU, the right neighboring CU, a right below neighboring CU, a left below neighboring CU and the below neighboring CU of the current CU belongs to a corresponding mode range respectively; if not, parsing an index of a pixel selected by the coding mode $M_{dec}^k$ corresponding to the current CU after being embedded with the hidden information and obtaining an i th bit value of the encrypted information $\hat{w}'_i$; completing an extraction of the hidden information in the current CU; i=i+1, executing step (2)_6i; else, executing step (2)_6i; wherein the right above neighboring CU is a neighboring CU which is above and on the right side of the current CU; the right below neighboring CU is a neighboring CU which is below and on the right side of the current CU; the left below neighboring CU is a neighboring CU which is below and on the left side of the current CU;

(2)_6i, setting a next CU needing to be processed in the current parse block as a current CU and executing step (2)_6b; moving on until a process of all the CU in the current parse block is completed and then executing step (2)_7;

(2)_7, setting a next CTU needing to be parsed of the current frame as a current parse block and executing step (2)_6; moving on until a process of all the CTU in the current frame is completed and then executing step (2)_8;

(2)_8, setting a next frame needing to be parsed in the target video stream str.bin$_{dec}$ as the current frame and executing step (2)_4; moving on until a process of all the frames in the target video stream str.bin$_{dec}$ is completed and completing the extraction of the hidden information;

(2)_9, obtaining n bit values of encrypted information and constructing an encrypted information $\hat{W}'$, $\hat{W}'\{\hat{w}'_1, \hat{w}'_2, \ldots, \hat{w}'_i, \ldots, \hat{w}'_{n-1}, \hat{w}'_n\}$; processing every bit value of the encrypted information of $\hat{W}'$ and the corresponding bit value of the key E with XOR and generating the decrypted information $\hat{W}$, $\hat{W}=\{\hat{w}_1, \hat{w}_2, \ldots, \hat{w}_i, \ldots, \hat{w}_{n-1}, \hat{w}_n\}$; wherein $\hat{w}'_1, \hat{w}'_2, \hat{w}'_i, \hat{w}'_{n-1}$ and $\hat{w}'_n$ represent a first encrypted bit value, a second encrypted bit value, an i th encrypted bit value, an n-1 th encrypted bit value and an n th encrypted bit value in $\hat{W}'$; the values of $\hat{w}'_1, \hat{w}'_2, \hat{w}'_i, \hat{w}'_{n-1}$ and $\hat{w}'_n$ are 0 or 1; $\hat{w}_1, \hat{w}_2, \hat{w}_i, \hat{w}_{n-1}$ and $\hat{w}_n$ represent a first decrypted bit value, a second decrypted bit value, an i th decrypted bit value, an n-1 th decrypted bit value and an n th decrypted bit value in $\hat{W}$, the values of $\hat{w}_1, \hat{w}_2, \hat{w}_i, \hat{w}_{n-1}$ and $\hat{w}_n$ are 0 or 1.

2. 3D-HEVC depth video information hiding method based on single-depth intra mode as recited in claim 1, wherein using $w'_i$ to modulate the index of the pixel selected by the coding mode $M_{org}^k$ corresponding to the current CU after being embedded with the hidden information when encoding the current CU in step (1)_6e and step (1)_6 specifically comprises steps of marking the index of the pixel selected by the coding mode $M_{org}^k$ corresponding to the current CU when encoding the current CU as $I_{org}^k$ and marking the index of the pixel selected by the coding mode $M_{org}^k$ corresponding to the current CU after being embedded with the hidden information as $\tilde{I}_{org}^k$ $$\tilde{I}_{org}^k = \begin{cases} I_{org}^k, & \text{if } I_{org}^k = w'_i \\ w'_i, & \text{if } I_{org}^k \ne w'_i \end{cases}.$$

3. 3D-HEVC depth video information hiding method based on single-depth intra mode as recited in claim 1, wherein in step (1)_6, a corresponding mode range of a right above neighboring CU of the current CU is a prediction mode set which comprises a 0th prediction mode and prediction modes from a 2nd to a 10th or a prediction mode set generated by DMM (Depth Modeling Mode) modes; a corresponding mode range of a right neighboring CU of the current CU is a prediction mode set which comprises the 0th prediction mode and prediction modes from a 1st to a 25th or a prediction mode set generated by DMM modes; a corresponding mode range of a right below neighboring CU of the current CU is a prediction mode set which comprises the 0th and the 1st predication modes and prediction modes from a 11th to the 25th or a prediction mode set generated by DMM modes; a corresponding mode range of a left below neighboring CU of the current CU is a prediction mode set which comprises the 0th prediction mode and prediction modes from a 26th to a 34th or a prediction mode set generated by DMM modes; a corresponding mode range of a below neighboring CU of the current CU is a prediction mode set which comprises the 0th and 1st predication modes and prediction modes from the 11th to the 34th or a prediction mode set generated by DMM modes.

4. 3D-HEVC depth video information hiding method based on single-depth intra mode as recited in claim 1, wherein parsing the index of the pixel selected by the coding mode $M_{dec}^k$ corresponding to the current CU after being embedded with hidden information and obtaining the i th bit value of the encrypted bit value $\hat{w}'_i$ in step (2)_6e and step (2)_6 is marking the index of the pixel selected by the coding mode $M_{dec}^k$ corresponding to the current CU after being embedded with hidden information as $\tilde{I}_{dec}^k$, $$\hat{w}'_i = \begin{cases} 0, & \text{if } \tilde{I}_{dec}^k = 0 \\ 1, & \text{if } \tilde{I}_{dec}^k = 1 \end{cases}.$$

5. 3D-HEVC depth video information hiding method based on single-depth intra mode as recited in claim 1, wherein in step (2)_6, a corresponding mode range of a right above neighboring CU of the current CU is a prediction mode set which comprises a 0th prediction mode and prediction modes from a 2nd to a 10th or a prediction mode set generated by DMM modes; a corresponding mode range of a right neighboring CU of the current CU is a prediction mode set which comprises the 0th prediction mode and prediction modes from a 1st to a 25th or a prediction mode set generated by DMM modes; a corresponding mode range of a right below neighboring CU of the current CU is a prediction mode set which comprises the 0th and the 1st predication modes and prediction modes from a 11th to the 25th or a prediction mode set generated by DMM modes; a corresponding mode range of a left below neighboring CU of the current CU is a prediction mode set which comprises the 0th prediction mode and prediction modes from a 26th to a 34th or a prediction mode set generated by DMM modes; a corresponding mode range of a below neighboring CU of the current CU is a prediction mode set which comprises the 0th and 1st predication modes and prediction modes from the 11th to the 34th or a prediction mode set generated by DMM modes.

\* \* \* \* \*